US005495102A

United States Patent [19]

Fine

[11] Patent Number: 5,495,102

[45] Date of Patent: Feb. 27, 1996

[54] SHOPPING CART MONITORING SYSTEM

[75] Inventor: Richard Fine, Mississauga, Canada

[73] Assignee: 989952 Ontario Limited, Richmond Hill, Canada

[21] Appl. No.: 136,085

[22] Filed: Oct. 14, 1993

[51] Int. Cl.$^{6}$ .............................. H01J 40/14; G01N 9/04

[52] U.S. Cl. .................. 250/222.1; 250/221; 250/223 R

[58] Field of Search ................................ 250/221, 222.1, 250/223

[56] References Cited

U.S. PATENT DOCUMENTS

| | | | |
|---|---|---|---|
| 3,457,423 | 7/1969 | Gravely . | |
| 3,725,894 | 4/1973 | Geisler | 340/280 |
| 4,327,819 | 5/1982 | Coutta | 340/568 |
| 4,723,118 | 2/1988 | Hooley et al. | 340/568 |
| 4,725,822 | 2/1988 | Hooley | 340/568 |
| 4,736,098 | 4/1988 | Rehrig | 250/222.1 |
| 5,021,644 | 6/1991 | Beran et al. | 250/221 |
| 5,210,406 | 5/1993 | Beran et al. | 250/221 |

FOREIGN PATENT DOCUMENTS

| | | |
|---|---|---|
| 2456981 | 12/1980 | France . |
| 3217944A1 | 5/1982 | Germany . |

*Primary Examiner*—William L. Sikes
*Assistant Examiner*—Fetsum Abraham
*Attorney, Agent, or Firm*—Ridout & Maybee

[57] ABSTRACT

A system for monitoring contents of a tray located beneath a basket of a shopping cart as the latter is passed through an aisle adjacent a checkout station having a point of sale terminal capable of receiving a signal through a communications interface which signal prevents completion of a transaction unless overridden by operator input of one of a product and an override code. The system includes apparatus adjacent the aisle for detecting and signalling presence of the cart in the aisle, apparatus adjacent the aisle for scanning a space above the tray of the cart to detect and signal the presence of objects thereon, and apparatus responsive to signals from both said cart detection apparatus and the object detection apparatus to output said signal to the communications interface of the terminal, thereby forcing the operator to enter one of a product and an override code.

13 Claims, 2 Drawing Sheets

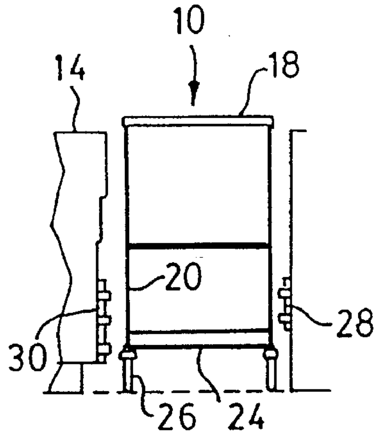
FIG. 2
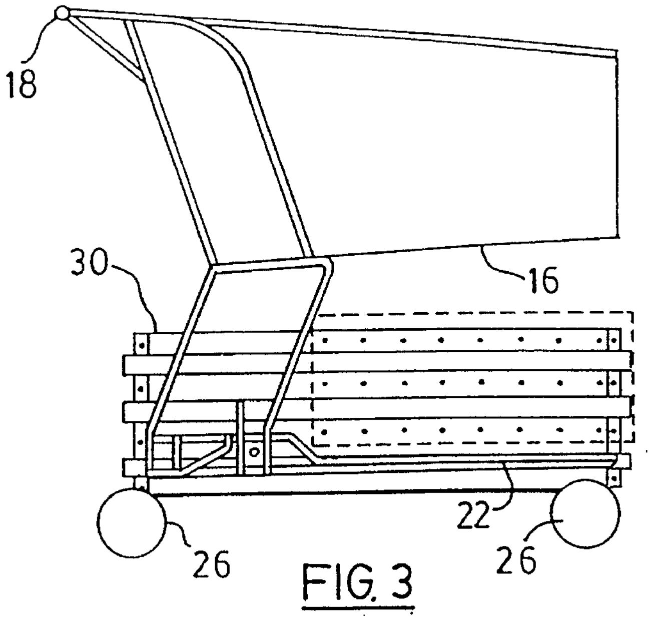
FIG. 3
FIG. 1
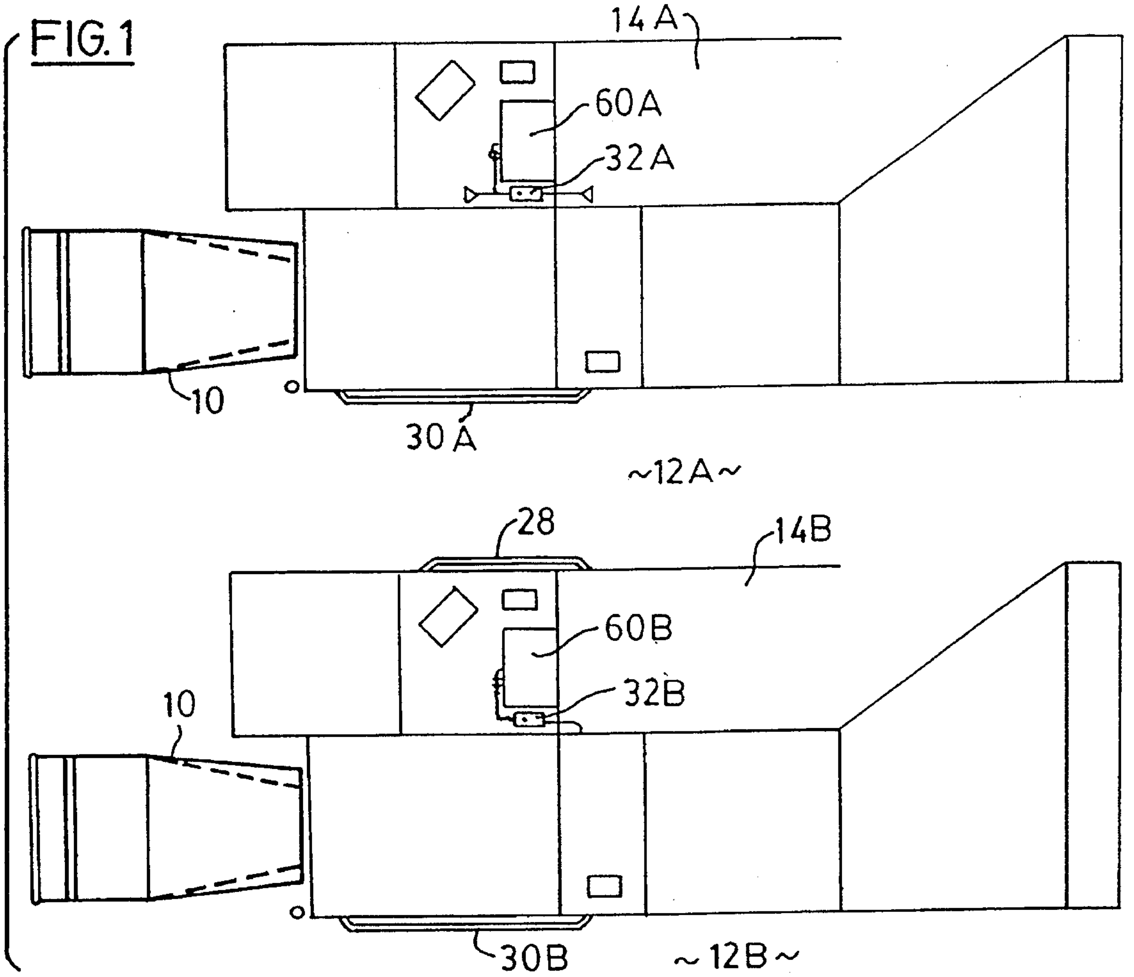

SHOPPING CART MONITORING SYSTEM

FIELD OF THE INVENTION

The present invention relates to an improved system for detecting a conventional shopping cart being moved through a supermarket checkout line and for signalling the presence of a load in the lower package tray of such a cart.

PRIOR ART

The conventional supermarket shopping cart includes a lower package tray positioned near floor level beneath the main basket of the cart, to hold bulky or heavy items and to encourage and/or permit customers to add to the number of items they might otherwise purchase. It is well established, however, that significant losses arise from lower-tray items, hidden from the ordinary sight lines of checkout clerks, being accidentally or intentionally wheeled through checkout aisles without being paid for.

A number of systems of varying degrees of complexity have been devised for signalling the presence of goods on the lower tray of a shopping cart in a supermarket checkout aisle. Experience has shown that checkout clerks cannot reliably be counted on to inspect each cart to ensure that there are no lower-tray items unaccounted for.

Most of the systems referred to in the patent literature involve the use of specially designed shopping carts or retro-fitted conventional carts carrying signal reflection or signal generating means to interact with stationary system components along the checkout line.

In U.S. Pat. No. 4,723,118 (Hoole et al), the shopping cart lower tray is pivotably movable between loaded and unloaded positions to displace a permanent magnet mounted to the cart, the magnetic field of which interacts with a control circuit in the checkout line.

In the system of U.S. Pat. No. 4,736,098 (Rehrig), a conventional shopping cart must be adapted by including a pair of biasing springs and a reflector on the bottom tray, such that a checkout aisle photoelectric assembly is triggered by passage of a cart through the checkout isle only when a load is on the bottom tray.

In these and other systems which require special features on the carts themselves there arise, to varying degrees, the problem of added costs in replacing or maintaining the carts themselves, as well as failure of such carts to function as desired by reason of incidental cart damage through wear and tear or through malicious tampering. Even when functional, the signals provided by such systems are sometimes ignored or overlooked because of the extra attention and labour required on the part of a checkout clerk to enter items located on the bottom tray.

SUMMARY OF THE INVENTION

It is accordingly an object of the present invention to provide a detection system for loads placed on the lower tray of a conventional shopping cart which involves no modifications or additions to the cart itself.

It is a further object of the present invention to provide a shopping cart monitoring system which upon detection of objects on the lower shelf of the cart will activate a signal visible to the checkout clerk.

It is a still further object of the present invention to provide a shopping cart monitoring system, which upon detection of merchandise on the lower shelf of a cart in the checkout isle of a supermarket causes the cash register requires affirmative action by the sales clerk either to enter a product code for an item on the lower shelf of the cart or an alternative authorisation code.

According to the invention there is provided a system for monitoring contents of a tray located beneath a basket of a shopping cart as the latter is passed through an aisle adjacent a checkout station having a point of sale terminal capable of receiving a signal through a communications interface which signal prevents completion of a transaction unless overridden by operator input of one of a product and an override code, the system comprising apparatus adjacent the aisle for detecting and signalling presence of the cart in the aisle, apparatus adjacent the aisle for scanning a space above the tray of the cart to detect and signal the presence of objects thereon, and apparatus responsive to signals from both said cart detection apparatus and said object detection apparatus to output said signal to the communications interface of the terminal, thereby forcing the operator to enter one of a product and an override code.

BRIEF DESCRIPTION OF THE DRAWINGS

FIG. 1 is a schematic view from overhead of adjacent supermarket checkout counters in which a system according to the present invention has been installed;

FIG. 2 is a schematic view along the direction of a supermarket checkout aisle in which a shopping cart is positioned for detection of lower-tray articles by a system according to the invention which has been installed at the checkout counter;

FIG. 3 is a schematic, partial view from the side of a checkout aisle opposite the checkout counter in which a system according to the present invention has been installed.

DESCRIPTION OF THE PREFERRED EMBODIMENT

Figure 4:
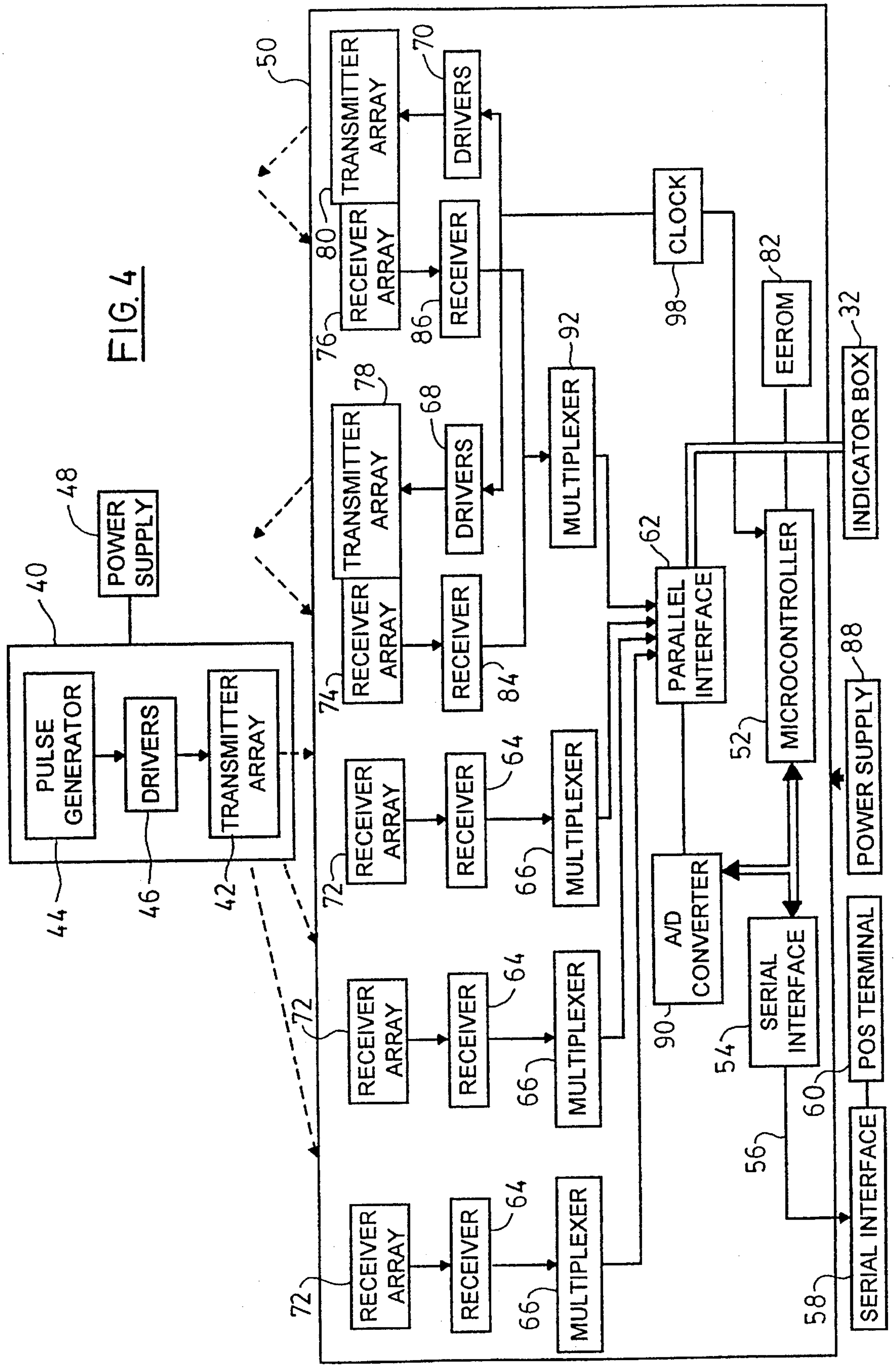
FIG. 4 is a schematic block diagram of the electronic circuits of the system.

Reference is first made to FIG. 1 showing in a schematic overhead view two conventional shopping carts 10 positioned in typical storage positions in front of and beside the aisles **12*a* and 12*b* of adjacent checkout counters 14*a* and 14*b* in a supermarket. Indices "a" and "b" are used only to refer to like components of systems according to the present invention installed in adjacent checkout stations, as in FIG. 1. Thus, an isle and checkout counter will hereinafter simply be referred to as 12 and 14**, respectively.

The views of FIGS. 2 and 3 show, in partial rear and side views, respectively, a shopping cart 10 passing through a predetermined location in aisle 12 for detection of items placed on the lower package tray of the cart. Cart 10 includes a basket portion 16, handle 18, a rearward, generally vertically extending frame member 20, and a bottom frame member 22 comprising a pair of horizontally placed frame side sections which support the lower package tray 24 above the wheels 26.

The principal hardware components in a preferred embodiment of the system comprise an infra red transmitter panel 28; an infra red detector/microcontroller panel 30; and indicator box 32 and a cable connection between the cash register terminal 60 at the checkout counter and the infra red detector/microcontroller panel 30. In operation of the system a customer moves a cart to the start of the conveyor, and unloads items to be purchased. The sales clerk begins to ring up the items purchased. The customer moves the cart through the lane, in order to pick up the bagged purchases. As the cart passes the receiver panel, it is detected, and the area above the lower shelf is scanned.

If objects are detected on the lower shelf, a message is sent to the cash register, and a red light emitting diode (LED) is activated on the indicator box 32. The program running on the cash register, detects the message from the receiver panel 30. When the sales clerk attempts to generate a sales total, the cash register program prompts the clerk to enter a product code for the item on the lower shelf of the cart. Once the clerk has entered a product code or codes, the cash register program allows the total to be generated, and the sale is terminated in the normal way.

In the event that the product code has already been entered, or the apparatus has detected an object which does not come from the store inventory or has generated a false alarm, the sales clerk can override the prompt by entering an override code in the form of a multi-digit sequence at the cash register keyboard.

Additional indicators and push button switches are accessible to service personnel by removing the indicator box cover. A yellow LED is activated if the previous cart scanned had an item on the lower shelf. A green LED is activated while a cart is in position for scanning. "Shelf" and "in position" push buttons are used to calibrate the system during installation, as described further below.

The infra red transmitter panel 28 consists of a thin metal enclosure mounted on the side of the check out lane, opposite from the cash register.

The outer face of the enclosure includes plastic lenses opaque to visible light, but transparent to infra red. Referring to FIG. 4, an array 42 of infra red transmitters, typically light emitting diodes having directional lenses is mounted on a circuit board 40 behind the plastic lenses. The transmitters transmit infra red light with an intensity which is modulated at a frequency of approximately 50 KHZ, an pulse generator 44 operating at that frequency controlling a driver circuit which powers the transmitters.

The number and arrangement of the transmitters is such as to provide a region of constant illumination for the lower shelf of a cart which is in the scanning position. The pulse generator may comprise a crystal oscillator and digital counters used to generate the 50 KHZ signal used to activate the infra red transmitters, which in a typical example may be five in number.

The transmitter panel is powered by means of a power supply suitable to power the transmitters, plugged into a receptacle on the adjacent check out lane. There is no signal wiring between the transmitter panel 28 and the panel 30 on the opposite side of the lane.

The panel 30 comprises a thin metal enclosure mounted on the same side of the check out lane as the cash register. The outer face of the enclosure includes plastic lenses opaque to visible light, but transparent to infra red, including an array of lenses opposite those the transmitter panel 28 to receive radiation from the transmitters on that panel.

A printed circuit board 50 is mounted behind the plastic lenses. This board includes arrays 72, 74 and 76 of infra-red sensors and arrays 78 and 80 of transmitters co-located with the receivers of arrays 74 and 76, behind the plastic lenses. It also includes signal processing circuits under control of a microcontroller 52 including a serial communications interface 54 for connection by a serial link 56 to a serial interface 58 of the point-of-sale (POS) terminal 60, and parallel ports 62 connecting the microcontroller respectively to input signals from receivers 64, 84 and 86, selected by a multiplexer 66, input and output signals from and to an indicator box 32, and output signals to transmitter drivers 68 and 70 for the arrays 78 and 80. Although in practice the ports 54 and 62 may form part of the microcontroller 52, which may be for example an MC68HC705C8 component from Motorola, they are shown separately for convenience in description: if another microcontroller or microprocessor were used, they might indeed be separate. The microcontroller also includes random access working memory, and programmable read only memory containig the program described further below. It further contains a watch-dog timer to monitor proper operation, and a four channel analog to digital converter 90. Further details are available from the manufacturers published product literature. Additional non-volatile memory 82 is provided for the storage of calibration data as described further below. The panel 30 is powered by a power supply unit 88.

As best seen in FIG. 3, the panel 30 includes a portion indicated by the dotted outline, which includes the array 72 of infra red sensors used in scanning the bottom package tray of the shopping cart. The array 72 of directional infra red receivers detect infra red light modulated at a frequency of approximately 50 KHZ from the array 42. When a cart is in position for scanning, groups of sensors in the array 72 are connected to different channels in receivers 64, one receiver for each group. With eight channels in a group, three groups allow for up to 24 sensors. The receivers 64 filter the outputs from each detector to isolate the 50 kHz component received from the array 42 and eliminate noise, and envelope detect the filtered signals. The multiplexer 66 selects each analog signal in turn from its associated receiver 64 and passes it through port 82 to a multiplexed channel of an analog to digital (A/D) converter 90, in this case incorporated in the microcontroller. The converter samples each multiplexed signal in turn to provide digitised values corresponding to the intensity of radiation reaching each sensor from the panel 28. The A/D converter 90 also receives inputs from the parallel port 82 from multiplexers 92 and 94 associated with the receivers 84 and 86, as described further below.

In order to determine when a cart is in position for scanning, the arrays 74, 76, 78 and 80 are utilised. The arrays 74 and 78 are formed by three transmitter and sensor pairs horizontally spaced respectively just to the rear, just at and just beyond the position occupied by a vertically extending frame member of a cart when positioned so that its lower tray lies between the panels 28 and 30. The arrays 76 and 80 are similarly formed with three pairs vertically spaced just abov, just level with and just below a bottom side member of the cart. Channels of the associated receivers 84 and 86 are similar to those of receivers 64 except that the filters are tuned to a substantially different frequency, in this case 10 kHz, to match the pulse frequency of the transmitters in the arrays 78 and 80. These are driven by drivers 68 and 70 which may be pulsed by signals divided down by divider 96 from the microcontroller clock 98. The different frequency avoids cross-talk with the shelf scanner signals. The six channels of receivers 84 and 86 are selected by an analog multiplexer 92 before being applied through port 82 to a fourth channel of the A/D converter.

The operation of the apparatus is described further with reference to the following pseudocode which sets forth the essentials of the program stored in the read only memory of the microcontroller 52.

-continued

```
  Main Program
begin main program
  initialize hardware
  initialize watchdog timer counter
  initialize timer interrupt
  read EEPROM data
  initialize variables
  initialize serial communication interface
  do (forever)
    re-initialize hardware
    start A/D conversion of middle cart "in position"
      detector
    check watchdog timer counter
    if timer timed out
      strobe watchdog timer
      reset timer
    end if
    check if SCI receiver buffer is full
    if SCI receiver buffer is full
    then
      process received command
    else if pushbutton has been pressed
      process pushbutton input
    else if cart has already been scanned
      check if cart detected by middle sensor
      if cart not detected by middle sensor
        reset cart already scanned flag
      end if
    else
      check if cart detected by middle sensor
      if cart detected by middle sensor
        scan cart
      end if
    end if
    Output LED status to hardware
  end do
end main program
begin process received command subroutine
  reset receive buffer pointer to point to first character
  get first character
  do one of the following cases
  case 'A':
    check if transmit buffer empty
    if transmit buffer empty
      read in all scan detectors
      read in all cart "in position" detectors
      convert and place scan detector readings in transmit
        buffer
      convert and place cart "in position" detector
        readings in transmit buffer
      place prompt in transmit buffer
      set number of bytes in transmit buffer
      start transmission
    end if
  end case 'A'
  case 'B':
    check if transmit buffer empty
    if transmit buffer empty
      read in all scan detectors
      convert and place scan detector readings in transmit
        buffer
      place prompt in transmit buffer
      set number of bytes in transmit buffer
      transfer item detector readings to infrared detector
        idle values structure
      write infrared detector idle values to EEPROM
      start transmission
    end if
  end case 'B'
  case 'C':
    check if transmit buffer empty
    if transmit buffer empty
      read in all cart "in position" detectors
      convert and place cart "in position" detector readings
        in transmit buffer
      place prompt in transmit buffer
      set number of bytes in transmit buffer
      transfer cart "in position" detector readings to
        infrared detector idle values structure
      write infrared detector idle values to EEPROM
```

```
      start transmission
    end if
  end case 'C'
  case 'D'
    convert next two digits in receive buffer to binary
    if the conversion error flag is not set
      store binary value to scan detector delta value
      write scan detector delta value to EEPROM
    end if
  end case 'D'
  case 'E':
    convert next two digits in receive buffer to binary
    if the conversion error flag is not set
      store binary value to cart "in position" detector
        delta value
      write cart "in position" detector delta value to
        EEPROM
    end if
  end case 'D'
  reset receive buffer and control lines
end process received command subroutine
begin process pushbutton input subroutine
  if shelf pushbutton pressed
    read all scan detectors
    read all cart "in position" detectors
    store scan detector readings and cart "in position"
      readings to infrared detector idle values
    write infrared detector idle values to EEPROM
    clear shelf pushbutton has been pressed flag
  end if
  if in position pushbutton pressed
    read all scan detectors
    read all cart "in position" detectors
    calculate delta values
    write infrared detector delta values to EEPROM
    clear in position pushbutton has been pressed flag
  end if
end process pushbutton input subroutine
begin process scan cart subroutine
  check if cart detected by outer sensors
  if cart detected by outer sensors
  then
    scan for item
    set cart already scanned flag
    set yellow LED status to red LED status
    check for item detected
    if item detected
    then
      set red LED status flag to on
      wait for transmit buffer to empty
      place item detected message in transmit buffer
      set number of bytes in transmit buffer
      reset transmit buffer pointer
      set transmit buffer full flag
      transmit preamble
    else
      set red LED status flag to off
    end if
  else
    clear item detected flag
  end if
end process scan cart subroutine
begin cheek if cart detected by middle sensor subroutine
  wait for A/D conversion to finish
  read value of A/D conversion
  subtract value from middle cart "in position" detector
    idle value
  compare to cart "in position" detector delta value
  if greater than delta value
  then
    set middle cart "in position" sensor detecting cart
      flag
  else
    clear middle cart "in position" sensor detecting cart
      flag
  end if
end check if cart detected by middle sensor subroutine
        Timer Tick Interrupt Routine
begin timer tick interrupt routine
  check watchdog timer counter value
```

-continued

```
    if counter value is not zero
        subtract one from counter value
    end if
    read shelf pushbutton input
    invert bit
    if shelf pushbutton pressed
        if stored shelf pushbutton status is not pressed
            set self pushbutton has been pressed flag
        end if
    end if
    store current status of shelf pushbutton
    read in position pushbutton
    invert bit
    if in position pushbutton pressed
        if stored in position pushbutton status is pressed
            set in position pushbutton has been pressed flag
        end if
    end if
    store current status of in position pushbutton
end timer tick interrupt routine
                SCI Interrupt Routine
begin SCI interrupt routine
    check interrupt status flags
    if receiver register full
        if receive buffer not full
            read byte from SCI receive register
            clear status flag
            store byte in receive buffer
            add one to pointer
            add one to number of characters in receive buffer
            if LF received but last character was not CR
                reset number of characters in receive buffer to zero
                reset pointer to first character
            end if
            if last two received bytes were CR and LF or buffer is
                full
                set receive buffer full flag
                set control lines to indicate terminal not ready
            end if
        end if
    end if
    check interrupt status flags
    if transmitter register empty
        if transmit buffer full flag set
            if control line indicate register is ready
```

-continued

```
                read byte from transmit buffer
                write byte to SCI transmit register
                clear status flag
                add one to pointer
                subtract one from number of characters in transmit
                    buffer
                if number of characters in transmit buffer is zero
                    clear transmit buffer full flag
                end if
            end if
        end if
    end if
end SCI interrupt routine
```

The operation of the foregoing program is described further below.

The main program is activated upon power up, and carries out the following activities:

The hardware is initialized
Program variables are initialized
The timer interrupt program is initiated
The Serial communication Interface receive interrupt is enabled.
The program then executes the following sequence forever 1. Hardware is reinitialized
2. The watch dog timer counter is decremented
3. The watch dog timer is strobed if the counter is not zero
4. Serial Port Commands are processed
5. If a cart is in position it is scanned The serial port commands are sent during manufacture or factory setup from a terminal or computer replacing the terminal 60, and all consist of an ASCII string terminated by a CR LF sequence. Invalid commands are ignored and an A> prompt is returned to the terminal. Upon power up, no prompt is returned. The first prompt is returned after a command has been issued. Valid commands are listed below:

| Command | Function |
|---|---|
| A | List current detector readings |
| B | Store current scan detector readings as empty cart readings |
| C | Store current In Position detector readings as Cart In Position readings |
| DHH | Store scan Delta<br>Where HH is a 2 digit ASCII HEX number |
| EHH | Store Cart In Position Delta<br>Where HR is a 2 digit ASCII HEX number |

List Command

When this command is received, the program returns the current sensor readings for display in the format shown below:

| | | | | | | | |
|---|---|---|---|---|---|---|---|
| G2,0 | G2,1 | G2,2 | G2,3 | G2,4 | G2,5 | G2,6 | G2,7 |
| G1,0 | G1,1 | G1,2 | G1,3 | G1,4 | G1,5 | G1,6 | G1,7 |
| G0,0 | G0,1 | G0,2 | G0,3 | G0,4 | G0,5 | G0,6 | G0,7 |
| | | | G3,6 | | | | |
| | | | G3,5 | | | | |
| | | | G3,4 | | | | |
| G3,0 | G3,1 | G3,2 | | | | | |

Where Gn,m is the reading from detector m in group n, and is a number between 0 and 255. With 255 representing the detection of no light at all, and 0 the detection of sufficient light to saturate the receiver. Bits 0–7 of Groups 0,1 and 2 are the channels of the three receiving 64, bits 0 to 2 or Group 3 are the channels of the receiver 84, and bits 3 to 6 are the channels of receiver 86.

Store Scan Detector Readings Command

When this command is received, the program returns the current scan sensor readings in the format shown below, saves them in RAM for immediate use in detecting items on the lower shelf of a cart, and saves them in EEROM for future use in detecting items on the lower shelf of a cart.

G2,0 G2,1 G2,2 G2,3 G2,4 G2,5 G2,6 G2,7
G1,0 G1,1 G1,2 G1,3 G1,4 G1,5 G1,6 G1,7
G0,0 G0,1 G0,2 G0,3 G0,4 G0,5 G0,6 G0,7

Store Cart In Position Readings Command

When this command is received, the program returns the current In Position detector readings in the format shown below, stores the values in RAM for immediate use in detecting a cart in position, and stores the values in EEROM 82 for future use in detecting a cart in position.

| | | | |
|---|---|---|---|
| | | | G3,6 |
| | | | G3,5 |
| | | | G3,4 |
| G3,0 | G3,1 | G3,2 | |

Store Scan Delta Command

When this command is received, the program stores the ASCII HEX value received, in RAM for immediate use in detecting objects on the lower shelf, and stores the value in EEROM 82 for future use in detecting objects on the lower shelf.

Store Cart In Position Delta Command

When this command is received, the program stores the ASCII HEX value received in RAM for immediate use in detecting a cart in position, and stores the value in EEROM 82 for future use in detecting a cart in position.

The program continuously searches for a Cart In Position state. For each of the horizontal and vertical arras 80 and 78 the outer Sensor readings are compared with the middle sensor readings. A Cart is Assumed to be in Position if the difference between middle and outer readings is greater than a difference (Position Delta) prestored in EEROM 82.

While a cart is in position, the green LED in the indicator box 28 is activated. Once a cart has been detected, In Position, the scanning sensor readings are compared with the scanning sensor readings prestored in EEROM 82 using the SHELF and IN POSITION commands as described below. The absolute difference between stored and current readings is calculated, and if it is greater than the prestored Delta, an object is assumed to be on the lower shelf.

If an object is on the lower shelf then; The message "Y" is transmitted on the serial link to the cash register or terminal, and the Red LED in the indicator box 28 is activated. The Yellow LED in the indicator box is set to the previous state of the Red LED.

If no object is on the lower shelf then nothing is transmitted on the serial link to the cash register and the Red LED is not activated. The Yellow LED is set to the previous state of the Red LED.

The push buttons on the Indicator box can be used to activate the following commands, used for calibrating the system.

| Push Button | Command |
|---|---|
| SHELF | Stores sensor readings for cart with item |
| IN POSITION | Stores sensor readings for cart in position and no item on shelf |
| SHELF and IN POSITION | Stores sensor readings for no cart |

When the SHELF button is pressed, the program saves the current item sensor readings in RAM for immediate use in detecting items on the lower shelf of a cart. It uses previously stored readings for an empty cart, together with these readings, to generate an item DELTA for use in detecting items on the lower shelf, and stores the item DELTA calculated.

When the IN POSITION button is pressed, the program saves the current item shelf sensor readings in EEROM for future use in detecting items on the lower shelf of a cart, and calculating the item DELTA, and uses the current IN POSITION sensor readings, together with previously stored IN POSITION sensor readings for "no cart in position", to calculate a cart IN POSITION DELTA.

When the SHELF and IN POSITION buttons are pressed together, the program saves the current IN POSITION sensor readings in EEROM for future use detecting a cart in position and for calculating the IN POSITION DELTA.

The program calculates the ITEM DELTA value by algebraically the difference between the sensor readings with no item on the cart, and with an item on the cart. The DELTA is set to 67% of this sum.

The program calculates the IN POSITION DELTA value by comparing the sensor readings for a cart in position and not in position. The DELTA is set to 67% of the difference between the middle sensor readings.

The Timer Interrupt Program is entered as a result of a timer tick interrupt, at 1 ms intervals. This routine carries out the following activities each time it is entered;

Delay counters are decremented

Every even ms; The A/D converters for each group are read and the data is stored in RAM, the multiplexers are then set to point to the next channel to read, and the watch dog timer counter is decremented.

Every odd ms; The A/D converters are strobed to start conversion for the currently selected channels.

The interrupt routine reads either the horizontal or vertical sensors as specified by the main program. Each time a complete scan of selected sensors has been read, a flag is raised notifying the main program that all three have been read. The interrupt routine sets a flag each time it completes a scan of all the scan sensors.

The main program normally controls the scanning of the In Position sensors by directing the interrupt routine to scan the horizontal sensors only. Each time a scan has been completed, the main program checks for a cart In Position. If a Cart is In Position, the main program directs the interrupt routine to scan the vertical sensors. When the vertical sensors have been scanned, the main program checks again for a cart In Position. Once the main program has determined that a cart is in position it processes the scan sensor readings to determine if an object is on the lower shelf.

The watch dog timer is designed to reset the system in the event of program failure. It is a retriggerable counter which generates a reset pulse unless it is retriggered (strobed) before it times out. The following sequence is used to ensure that the main program and interrupt routines are working correctly.

The microcontroller hardware is reinitialized at regular intervals to ensure that microcontroller hardware has not been disturbed by power outages or transients. The interrupt routine sets a counter to a maximum value each time it is executed. The main program decrements this counter each time it executes a loop.

If the counter is non zero, the main program strobes the watch dog timer once each time it executes a pass through its loop. This prevents the watch dog timer from resetting the system. If the interrupt routine fails, the counter is not reset to its maximum value, and eventually is decremented to 0. The main program then stops strobing the watch dog timer, and the system is reset by the watch dog timer when it times out. If the main program fails, the watch dog timer is not strobed, and once again the system is reset. If the hardware state of the microcontroller is changed by a transient, it is returned to normal at the start of the next loop execution when the microcontroller hardware is reinitialized.

The SCI receive interrupt routine transfers characters into the SCI receive buffer, and raises a flag for the main program, each time a CR LF sequence is received or the receive buffer becomes full. The SCI transmit interrupt routine is started by the main program and transmits the specified number of characters from the SCI transmit buffer. A flag is raised when the transmission has been completed.

Once the system described above has been installed in a check out lane, check out procedures can proceed at the cash register (POS terminal) in the normal way.

When carts are moved through the lane with no items on the lower shelf, the system will have no effect on check out procedures. If an item is detected on the lower shelf of the cart, the POS terminal is programmed to respond to the Y signal received through its serial interface by displaying the following prompt after the "TOTAL" key has been pressed.

ITEM ON LOWER SHELF ENTER PRODUCT CODE

The product code for the item on the lower shelf must now be entered by scanning the item UPC or entering the product code at the keyboard. After one or more product codes have been entered, the TOTAL key can be used in the normal fashion. The entry of Product Codes can be overridden by entering an override code at the cash register keyboard, the override code being a standard feature of POS terminals and electronic cash registers and set according to the instructions of its manufacturer.

When no cart has been detected, and the "TOTAL" key is pressed, the following prompt is displayed: PLEASE PULL CART THROUGH A cart must be pulled through, or the override code entered, before the TOTAL key can be used in the normal fashion.

The system can be field calibrated using the push buttons in the Indicator Box, or factory calibrated through the serial port using the commands described above.

Field calibration is carried out in simple steps, after system installation using the push buttons on the indicator box 32. With no cart in position, the SHELF and IN POSITION buttons are pressed simultaneously. The system saves the Cart In Position sensor readings with no cart in position. The RED LED blinks while the data is being processed. An empty cart is moved into position, and the IN POSITION button is pressed. The system saves the Cart In Position DELTA and the Item sensor readings for no item on the shelf. The YELLOW LED blinks while the data is being processed. An item of size comparable to the smallest item to be detected is placed on the shelf of the cart, and the SHELF button is pressed. The system calculates and saves the item DELTA. The GREEN LED blinks while the data is being processed.

If the system is to be calibrated in the factory, an ASCII terminal is connected, in place of a cash register or POS terminal, to the serial port. A cart is moved into position and a "C" command is issued. The values returned by the command are inspected, and the difference between the middle and outer sensor readings calculated. This value is reduced by 30% and entered using the "E" command as the In Position Delta value.

A cart is then moved into position with an empty lower shelf. The "B" command is used to display and store the sensor readings for an empty lower shelf. The smallest object to be detected is placed on the shelf, and the "A" command is used to list the scan sensor readings. The sensor readings are inspected and the sum of absolute differences between readings with and without the item on the shelf are generated. This value is reduced by 30% and entered using the "D" command as the Scanning Delta. The "A" command can be used with a cart in a variety of positions to determine the sensitivity of the system to objects on the lower shelf.

It will be understood that the terminal 60 must be programmed to respond generally as described above to the transmission of a "Y" to its serial interface. Terminals are readily available that have this capability, and the programming required will be readily carried out by persons familiar with such equipment.

It should be understood that the system described above is exemplary only of the features of the invention, and variations and modifications are possible within the scope of the appended claims.

I claim:

1. A system for detecting the presence of a load on a bottom package tray positioned beneath a basket of a shopping cart as the shopping cart is wheeled through an aisle adjacent a checkout station having a cash register terminal, comprising:

first radiation transmitters positioned to a side of said aisle and operable to provide illumination spanning said structural elements of a shopping cart when the cart is located at a predetermined position in said aisle;

first radiation receivers positioned to the same side of the aisle as said first source of radiation and responsive to radiation reflected by said selected cart structural elements illuminated by said first radiation transmitters to generate a characteristic ouptut signal when said cart is located at said predetermined position;

second radiation transmitters positioned to a side of said aisle to illuminate a region over the bottom package tray of the shopping cart when located at said predetermined position in said aisle;

second radiation receivers, the receivers being directional and arranged in an array positioned on a side of said aisle to receive radiation from said second radiation transmitters and responsive thereto to provide output signals of a first intensity when said bottom package tray is empty and of a different intensity when a load thereon affects transmission of radiation from said second radiation transmitters to said second radiation receivers;

a warning signal generator for presenting a warning signal to an operator of the terminal; and a controller responsive to the output signals of said first and second radiation receivers and operatively connected to said warning signal generator for signalling the operator, said controller being configured to perform the following steps, (i) when receiving output signals from said first receivers characteristic of the presence of the cart at said predetermined position in the aisle, comparing the output signals from said second receivers with prestored reference signals characteristic of an empty bottom package tray; and (ii) if the differences between said prestored reference signals and the output signals from said second receivers exceed a preset limit, actuating said warning signal generator, thereby prompting the operator to check for merchandise on the bottom package tray.

2. A system according to claim 1, wherein said second transmitters are arranged on a panel mounted to a wall of the aisle opposite the check out station, and said second receivers include a generally rectangular array of radiation sensors on a panel mounted to a wall of the aisle opposite said panel on which the transmitters are located.

3. A system according to claim 2, wherein said first transmitters and said first receivers are positioned on the same panel as the second receivers.

4. A system according to claim 1, wherein said warning signal generator comprises an indicator which is illuminated when a load is detected on the bottom package tray of the cart during checkout.

5. A system according to claim 1, further comprising a communications interface connecting said controller to the terminal of the check out station, and wherein said controller is configured to perform the further step, contemporaneously with step (ii), of sending to the terminal through the communications interface a command inhibiting generation of a sales total until at least one of the product code for merchandise on the bottom package tray and an override code has been entered into the terminal by an operator.

6. A system according to claim 1, wherein said first radiation transmitters are positioned to irradiate zone spanning positions assumed by at least two reflective structural members of a cart when located at a predetermined location in the aisle, and said first radiation receivers are multiple receivers disposed to receive radiation reflected by said structural members such that outputs from said receivers assume a characteristic pattern responsive to the presence of a cart at the predetermined location.

7. A system according to claim 1, wherein the transmitters transmit infra-red radiation, and the receivers respond to infra-red radiation.

8. A system according to claim 1, wherein the transmitters transmit pulse modulated radiation, and the receivers include demodulators.

9. A system according to claim 8, wherein the first and second transmitters have different modulation frequencies, and the first and second receivers respond only to the frequencies of the first and second transmitters respectively.

10. A system according to claim 1, wherein said controller includes a first routine to compare the pattern of outputs of the first receivers for similarity to a previously stored pattern of outputs, a routine to compare the pattern of outputs of the second receivers for differences from a previously stored pattern of outputs, and a routine to actuate said warning signal generator in response to detecting both a sufficient degree of similarity between the pattern in said first routine, and a sufficient degree of dissimilarity between the patterns in said second routine.

11. A system for monitoring contents of a tray located beneath a basket of a shopping cart as the latter is passed through an aisle adjacent a checkout station having a point of sale terminal capable of receiving a signal through a communications interface which signal prevents completion of a transaction unless overridden by operator input of one of a product and an override code, the system comprising apparatus adjacent the aisle for detecting and signalling presence of the cart in the aisle, apparatus adjacent the aisle for scanning a space above the tray of the cart to detect and signal the presence of objects thereon, and apparatus responsive to signals from both said cart detection apparatus and said object detection apparatus to output said signal to the communications interface of the terminal, thereby forcing the operator to enter one of a product and an override code;

wherein the apparatus for detecting and signalling the presence of objects on the tray comprises second radiation transmitters on one side of the aisle and second radiation receivers on an opposite side of the aisle, the further transmitters and receivers facing each other across a space between the tray and the basket when the cart is in said predetermined position, such that the outputs of at least one of said receivers will be reduced by the presence of an object on the tray which obstructs radiation from the transmitters; and wherein the transmitters transmit pulse modulated radiation, and the receivers include demodulators.

12. A system according to claim 11, wherein the first and second transmitters have different modulation frequencies, and the first and second receivers respond only to the frequencies of the first and second transmitters respectively.

13. A system for monitoring contents of a tray located beneath a basket of a shopping cart as the latter is passed through an aisle adjacent a checkout station having a point of sale terminal capable of receiving a signal through a communications interface which signal prevents completion of a transaction unless overridden by operator input of one of a product and an override code, the system comprising apparatus adjacent the aisle for detecting and signalling presence of the cart in the aisle, apparatus adjacent the aisle for scanning a space above the tray of the cart to detect and signal the presence of objects thereon, and apparatus responsive to signals from both said cart detection apparatus and said object detection apparatus to output said signal to the communications interface of the terminal, thereby forcing the operator to enter one of a product and an override code;

wherein the apparatus for detecting and signalling the presence of objects on the tray comprises second radiation transmitters on one side of the aisle and second radiation receivers on an opposite side of the aisle, the further transmitters and receivers facing each other across a space between the tray and the basket when the cart is in said predetermined position, such that the outputs of at least one of said receivers will be reduced by the presence of an object on the tray which obstructs radiation from the transmitters; and wherein the signal responsive apparatus is a controller including a first routine to compare the pattern of outputs of the first receivers for similarity to a previously stored pattern of outputs, a routine to compare the pattern of outputs of the second receivers for differences from a previously stored pattern of outputs, and a routine to emit said signal in response to detecting both a sufficient degree of similarity between the patterns in said first routine, and a sufficient degree of dissimilarity between the patterns in said second routine.

* * * * *